United States Patent Office 3,185,811
Patented May 25, 1965

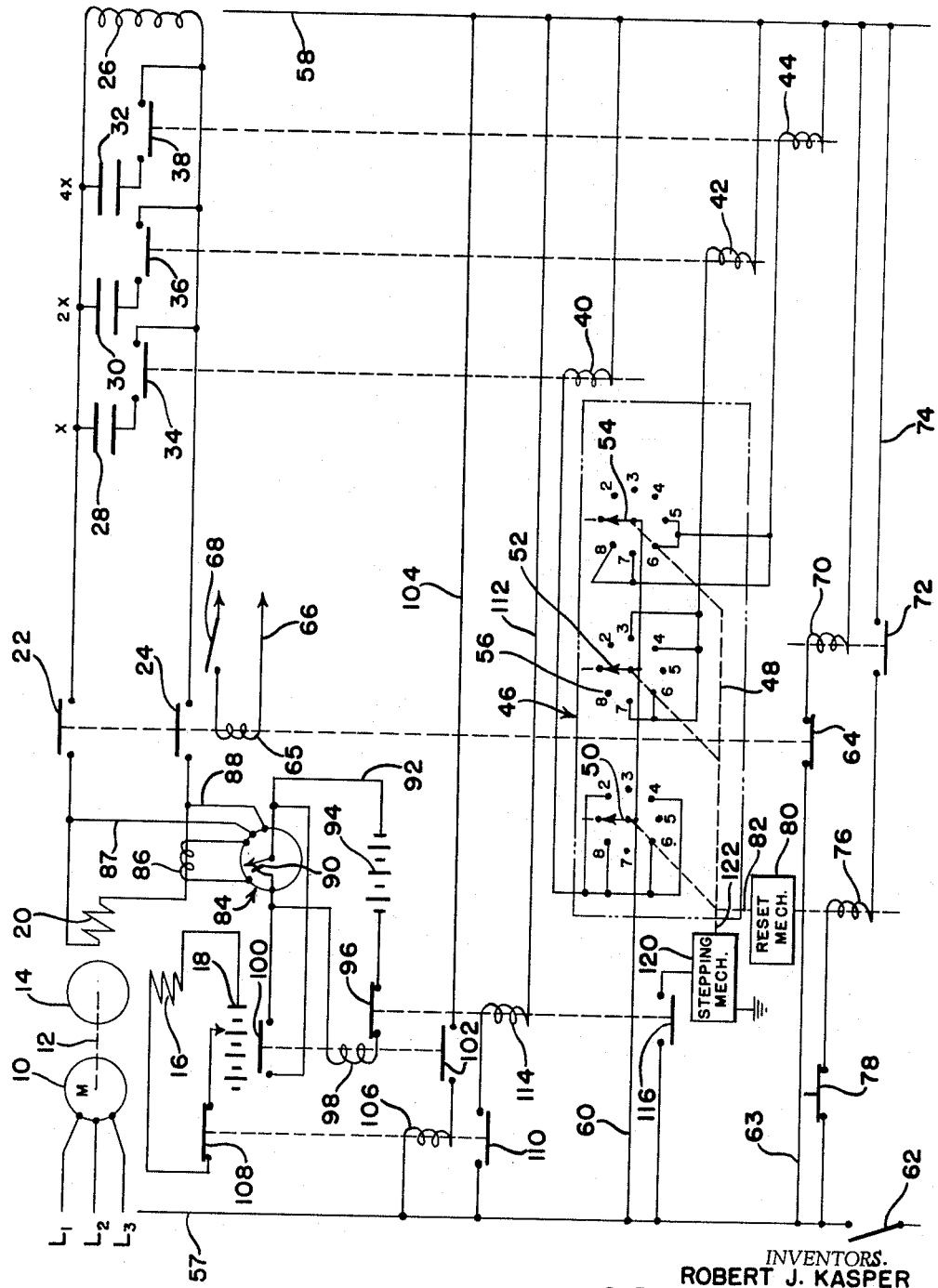

3,185,811
AUTOMATIC INDUCTION FURNACE CONTROL
Robert J. Kasper, Seven Hills, and Richard F. Seyfried, Parma Heights, Ohio, assignors to The Ohio Crankshaft Company, Cleveland, Ohio, a corporation of Ohio
Filed Oct. 26, 1961, Ser. No. 147,774
6 Claims. (Cl. 219—10.77)

This invention pertains to the art of high-frequency induction furnaces, and more particularly to an improved control circuit for furnaces of this type.

The present invention is particularly applicable to automatically controlling the power factor of the load of an induction melting furnace on a power source and will be described with particular reference thereto; however, it is to be appreciated that the invention has much broader application and may be used in a variety of induction heating apparatus.

The power circuit for high-frequency induction melting furnaces usually comprises a power source, such as a motor-generator set, main line contacts for selectively connecting the generator to an induction heating coil of the furnace, a plurality of power factor correcting capacitors, and means for varying the number of capacitors in the circuit to correct the power factor of the load demand on the power source. As the load heats, this power factor changes. To maintain the power factor within prescribed limits it has heretofore been necessary for an operator to observe various meters and change the number of capacitors across the induction heating coil as the impedance of the load changes during a heating cycle. When making the change, the operator also must de-energize the field windings of the generator. The amount of time spent by the operator to make the changes substantially increases the cost of operating the furnace.

The present invention is directed to a furnace control circuit which overcomes the above difficulties and automatically changes the capacitance across the induction coil as the impedance of the load varies to thereby maintain a substantially constant power factor.

In accordance with the present invention, an induction heating furnace having a power supply source connected to an induction coil is provided with a control circuit for automatically correcting the power factor of the power supplied by the power source which circuit comprises means for sensing the lag in the power factor or current supplied to the induction coil, a first means for de-energizing the coil and a second means for progressively increasing the capacitance across the coil until a power factor of substantially unity is obtained, the first and second means being operated sequentially by the sensing means.

In accordance with another aspect of the present invention, the control circuit is provided with a means for automatically changing the capacitance across the induction coil to a minimum capacitance prior to starting the heating cycle of the furnace.

The primary object of the present invention is to provide a control circuit for automatically correcting the power factor of an induction heating device by changing the amount of capacitance across the load as the impedance of the load varies.

Still a further object of the present invention is to provide such an automatic control circuit which may be easily added to an induction heating device and which will not substantially increase the cost of the device.

Another object of the present invention is to provide a control circuit for automatically correcting the power factor on an induction heating device which de-energizes the control windings of a power supply generator and then changes the amount of capacitance across the load as the impedance of the load varies.

Still another object of the present invention is to provide a control circuit for automatically correcting the power factor of an induction heating device which progressively increases the amount of capacitance across the load as the impedance of the load increases and which automatically resets the capacitance across the load to a minimum amount before starting the heating cycle of the device.

Still a further object of the present invention is to provide a control circuit for automatically controlling the power factor of an induction heating device comprising a means for progressively increasing the amount of capacitance across the load to correct the power factor of the device and which is provided with a means for resetting the capacitance to a minimum amount both before and after the heating cycle to assure that the induction heating device is started with a minimum capacitance across the load.

Another object of the present invention is to provide a control circuit for automatically correcting the power factor of an induction heating device which control utilizes a stepping switch to incrementally increase the capacitance across the load as the power factor of the device deviates substantially from a preset value.

These and other objects and advantages will become apparent from the following description used to illustrate the preferred embodiment of the invention as read in connection with the accompanying single figure drawing which comprises a schematic circuit diagram of the invention.

Referring now to the drawing which is for the purpose of illustrating a preferred embodiment of the invention and not for the purpose of limting the same, a motor 10 is connected through a mechanical link 12 to a high-frequency generator 14 provided with a field control winding 16, connected across an adjustable D.C. source such as a battery 18, and an output winding 20. As shown, the output winding 20 is connected through main line contacts 22, 24 to a load or an induction coil for a melting furnace, schematically illustrated at 26. Connected in parallel between the opposite terminals of the induction coil 26 are a plurality of power factor correcting capacitors 28, 30 and 32, having capacitance of respectively $x$, $2x$ and $4x$ such that by properly placing such capacitors in the circuit across the coil 26, a capacitance range of $x$, $2x$, $3x$, $4x$, $5x$, $6x$, and $7x$ may be conveniently obtained. Connected in series with capacitors 28, 30 and 32 are contacts 34, 36 and 38 respectively. These capacitor contacts are controlled by appropriate relays such as relays 40, 42 and 44 controlled by an eight position capacitor stepping switch 46 enclosed in phantom lines. The stepping switch may assume a variety of structural embodiments and the particular details disclosed are not intended to limit the particular structural features of this switch. As shown, the capacitor stepping switch 46 is provided with an appropriate operating means which, for illustrative purposes only, is disclosed schematically as a lever 48 joined by appropriate links to contact arms 50, 52 and 54 positioned within switch 46. A plurality of circumferentially arranged contacts 56 coact with the contact arms 50, 52 and 54 which move in unison to contact a given position of the switch which position determines the particular combination of relays 40, 42 and 44 that are energized. Each of the contact arms 50, 52 and 54 are connected across control lines 57, 58 to complete the circuit through the stepping switch 46 and the particular relays 40, 42 and 44 that are energized thereby.

As thus far explained, the position of the contact arms within stepping switch 46 determines the amount of capacitance across coil or load 26. In the past, the stepping switch 46 was manually controlled in accordance with the impedance across the coil 26. The present invention is directed to an automatic control circuit for actuating the stepping switch in accordance with the impedance of coil 26.

Referring again to the drawing, a switch 62 controls the voltage to lines 57, 58, and a parallel line 63 is positioned between the control lines 57, 58. In series, in the line 63 there is provided a normally closed contact 64, controlled by a relay 65 in a heating cycle control circuit 66 having starting switch 68, and a relay 70 having a time delay contact 72 positioned in parallel line 74. On actuation of the relay 70 the contact 72 is held in its closed position until the contact is timed out. Parallel line 74 is also provided with a relay 76 and a manually operated disconnect switch 78. Operably connected to relay 76 by any appropriate means is a reset mechanism 80 for resetting stepping switch 46 to the first, or minimum capacitance, position. It is not essential that relay 76 be used to operate the reset mechanism because various structural modifications can be made without departing from the scope of the invention. Reset mechanism 80 in turn is operably connected to the schematically represented lever 48 by a link 82. The link 82 may assume a variety of structural embodiments such as a mechanical, hydraulic or electrical coupling. The essential feature is that the reset mechanism is actuated to reset the stepping switch 46 to a minimum capacitance position.

A device is provided for sensing changes in the impedance of coil 26. Such a device is represented in the preferred embodiment as a kilovar meter 84 having current winding 86 and voltage leads 87, 88 connected appropriately to the power supply lines leading to coil 26. The kilovar meter 84 senses any change in the power factor of the power supplied to the coil 26 and may be provided with an adjustable switch 90 which is closed when the power factor varies from unity by a preset amount determined by adjusting the closing position of switch 90. The switch 90 is closed when the capacitance across the coil 26 is not sufficient to maintain the desired power factor. Electrically connected in series with the switch 90 is a kilovar circuit 92 having a D.C. source such as a battery 94, normally closed contact 96 and a relay coil 98. To provide stability to the kilovar circuit 92, it is within the contemplation of the invention to provide a bypass contact 100 which is operably connected to coil 98. The coil 98 or another coil in circuit 92 controls a normally open contact 102 in parallel line 104. Connected in series with contact 102 is an appropriate relay 106 having a quick response contact 108 positioned within the field control winding circuit of generator 14 and a time delay contact 110 which follows the actuation of contact 108. The time delay contact 110 of relay 106 is positioned in parallel line 112 which also is provided with a relay 114 operably connected to normally closed contact 96 in circuit 92. Relay 114, or another relay in line 112, actuates normally open contact 116 to control a stepping mechanism 120 operably connected to lever 48 by an appropriate means schematically represented by links 122. On closing of contact 116 the stepping mechanism may be connected between control lines 57, 58, or grounded as disclosed in the figure, which energizes stepping mechanism 120 to advance switch 46 to the next higher position. Various mechanisms may be used for advancing the position of switch 46 and the schematically represented mechanism is used for illustrative purposes.

In operation of the control circuit disclosed in the drawing and beginning with all of the contacts in the position shown, switch 62 is closed to energize the control circuit and cause a flow of current through line 63. In this manner, relay 70 is energized to close normally open contact 72. Current flows through line 74 until the contact 72 is timed out to again open the line 74. Before line 74 is opened, the relay 76 actuates reset mechanism 80 to adjust the stepping switch 46 to position No. 1. In this position, the switch 46 does not energize any of the relays 40, 42 and 44 so the capacitors 28, 30 and 32 are not connected across load 26. Starting switch 68 is then closed to energize relay 65 which in turn closes main line contacts 22 and 24 and opens contact 64.

By closing the main line contacts 22 and 24, the current is directed from output winding 20 to load 26. As the impedance in load 26 increases, the kilovar meter 84 closes adjustable contact 90 which actuates circuit 92 to energize coil 98. In essence, the closing of switch 90 creates a signal indicating a certain lag in the current supplied to the load 26. Actuation of coil 98 by the signal from contact 90 closes contact 100 in parallel with contact 90 so that the kilovar meter 84 is shunted out of the circuit 92. The primary reasons for providing a bypass, or shunt, contact 100 is to prevent deactivation of relay 98 if the contact 90 is momentarily disrupted after being first closed. The relay 98 not only controls contact 100, but also controls normally open contact 102 which engages line 104 between control lines 57 and 58. In this manner, relay 106 is actuated to instantaneously open contact 108 which disconnects field control winding 16 from the D.C. source 18. After the field control winding is opened, the time delayed contact 110 is closed to energize relay 114 which opens contact 96 in circuit 92 and closes contact 116. By opening contact 96, circuit 92 is disconnected and relay 98 releases switches 100 and 102 to de-energize relay 106. As relay 106 is de-energized, switch 108 closes and thereafter switch 110 opens to de-energize relay 114 and place the control circuit in the starting position for a subsequent operation. While relay 114 is energized to close contact 116, the stepping mechanism 120 is actuated to advance the stepping switch 46 to the next higher position, i.e., position No. 2. In this position, relay 40 is actuated to close contact 34 which places capacitor 28 in parallel with the load 26. If the capacitance of capacitor 28 is not sufficient to correct the power factor, the cycle is again followed to advance the stepping circuit to the next position, i.e., position No. 3 which places capacitor 30 in parallel with load 26. The same type of operation continues until the kilovar meter 84 indicates that the power factor is not substantially different from the desired power factor. Thereafter, if the impedance of load 26 increases further, the kilovar meter is again actuated to place an incrementally higher capacitance in parallel across the load. Other means may be provided for progressively increasing the capacitance across load 26; however, the stepping switch 46 has proven satisfactory.

After the heating cycle is completed, switch 68 is opened which closes contact 64 to again energize relay 70. If the switch 62 has not been previously opened, relay 70 actuates reset mechanism 80 to position the stepping switch 46 for a subsequent heating operation. It is noted that relay 70 is operated both at the beginning by closing switch 62 and sometimes at the end of the heating cycle by opening switch 68. This is to assure that the stepping switch 46 is reset to position No. 1 before a subsequent heating operation is commenced. If switches 62 and 68 are operated together an appropriate time delay mechanism may be provided to assure that contact 64 is closed momentarily while switch 62 is closed.

Various structural modifications may be made in the preferred embodiment of the present invention as disclosed in the drawing without departing from the spirit and the scope of the appended claims.

Having thus described our invention, we claim:

1. In an induction heating device having a power source, an inductive load connected to said power source, a plurality of power factor correcting capacitors adapted to be connected in parallel with said load, and a stepping switch for connecting one or more of said capacitors in parallel with said load to increase the capacitance across the load and correct the power factor of the device, the improvement comprising: a control circuit for automatically controlling the power factor of the power supplied from said power source, said circuit comprising a sensing means for sensing the lag in the current supplied to the load, an actuating means for actuating said stepping switch to increase the capacitance across said load as said actuating means is energized, said sensing means operably connected to said actuating means to energize said actuating means when said lag in current reaches a preset amount, switch means for selectively connecting said load onto said power source, and reset means for automatically resetting said stepping switch to an initial, minimum capacitance, position before operating said switch means.

2. In an induction heating device having a power source, an inductive load connected to said power source, a plurality of power factor correcting capacitors adapted to be connected in parallel with said load, and a stepping switch for connecting one or more of said capacitors in parallel with said load to increase the capacitance across the load and correct the power factor of the device, the improvement comprising: a control circuit for automatically controlling the power factor of the power supplied from said power source, said circuit comprising a sensing means for sensing the lag in the current supplied to the load, an actuating means for actuating said stepping switch to increase the capacitance across said load as said actuating means is energized, said sensing means operably connected to said actuating means to energize said actuating means when said lag in current reaches a preset amount, said power source comprising a generator having a field winding and an output winding, said output winding connected to said load, and a disconnect means for disconnecting said field winding, said disconnect means being energized to disconnect said field winding while said actuating means actuates said stepping switch.

3. In an induction heating device having a power source, an inductive load connected to said power source, a power factor correcting means comprising a variable capacitor and first means for adjusting said capacitor, said variable capacitor connected in parallel with said load, the improvement comprising: a control circuit for automatically controlling the power factor of said device, said circuit comprising a sensing means for sensing a lag in the current supplied to the load, said sensing means connected to said first means, a second means for causing a signal when said current lags a preset amount, said second means connected between said sensing means and said first means, and a third means for directing said signal from said second means to said first means, said first means adjusting said capacitor when receiving said signal, said power source comprising a generator having a field winding and an output winding, said output winding connected to said load, and a means for de-energizing said field winding, said de-energizing means being energized to de-energize said field winding while said first means adjusts said variable capacitor.

4. In an induction heating device having a power source, an inductive load connected to said power source, a power factor correcting means comprising a variable capacitor and first means for adjusting said capacitor, said variable capacitor connected in parallel with said load, the improvement comprising: a power circuit for automatically controlling the power factor of said device, said circuit comprising a sensing means for sensing a lag in the current supplied to the load, said sensing means connected to said first means, a second means for causing a signal when said current lags a preset amount, said second means connected between said sensing means and said first means, and a third means for directing said signal from said second means to said first means, said first means adjusting said capacitor when receiving said signal, said sensing means comprising a power factor meter connected to said load, said second means comprising an adjustable contact closed by said power factor meter when said current lags by a preset amount, an auxiliary power source connected across said adjustable contact, a shunt circuit connected around said adjustable contact and in series with said auxiliary power source, and means responsive to the closing of said adjustable contact by said power factor meter for connecting said shunt circuit in parallel around said adjustable contact.

5. The improvement as defined in claim 4 wherein said third means includes a relay controlled by said adjustable contact, a second contact closed by said relay, said second contact controlling said stepping switch.

6. The improvement as defined in claim 5 wherein said power source includes a generator having a field winding circuit, said relay concurrently interrupting said winding circuit as said relay closes said second contact.

References Cited by the Examiner
UNITED STATES PATENTS

| | | | |
|---|---|---|---|
| 2,293,484 | 8/42 | Anderson | 323—128 |
| 2,460,467 | 2/49 | Nelson et al. | 323—105 |

LLOYD McCOLLUM, *Primary Examiner.*